US012397659B2

(12) United States Patent
Park

(10) Patent No.: US 12,397,659 B2
(45) Date of Patent: Aug. 26, 2025

(54) SILENCER FOR FUEL CELL VEHICLE

(71) Applicants: Hyundai Motor Company, Seoul (KR); Kia Corporation, Seoul (KR)

(72) Inventor: Ki Ho Park, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 329 days.

(21) Appl. No.: 18/119,185

(22) Filed: Mar. 8, 2023

(65) Prior Publication Data

US 2024/0149712 A1 May 9, 2024

(30) Foreign Application Priority Data

Nov. 7, 2022 (KR) .......................... 10-2022-0146661

(51) Int. Cl.
*B60L 50/72* (2019.01)
*G10K 11/162* (2006.01)
*G10K 11/172* (2006.01)

(52) U.S. Cl.
CPC ............ *B60L 50/72* (2019.02); *G10K 11/162* (2013.01); *G10K 11/172* (2013.01); *B60L 2270/142* (2013.01)

(58) Field of Classification Search
CPC ................ G10K 11/162; G10K 11/172; B60L 2270/142
USPC ......................................................... 181/237
See application file for complete search history.

(56) References Cited

U.S. PATENT DOCUMENTS

| 4,116,303 | A * | 9/1978 | Trudell ..................... F01N 1/06 181/252 |
| 4,842,096 | A * | 6/1989 | Fujitsubo .................. F01N 1/24 181/254 |
| 7,434,570 | B2 * | 10/2008 | Hill .......................... F01N 1/10 181/227 |
| 7,537,084 | B2 * | 5/2009 | Buckley ................... F01N 1/165 181/269 |
| 7,743,883 | B2 * | 6/2010 | Kondo ............. H01M 8/04156 181/252 |
| 8,439,156 | B1 | 5/2013 | Abram |
| 10,518,632 | B2 * | 12/2019 | Bell ......................... F01N 1/166 |

(Continued)

FOREIGN PATENT DOCUMENTS

| CN | 1556315 A | 12/2004 |
| JP | 61 175529 U | 11/1986 |

(Continued)

*Primary Examiner* — Forrest M Phillips
(74) *Attorney, Agent, or Firm* — Morgan Lewis & Bockius LLP

(57) ABSTRACT

A silencer for a fuel cell vehicle includes: an internal pipe including a first drain disposed in a lower portion of an external circumferential surface thereof and configured to discharge water and a plurality of gas flow ports disposed in an upper portion of the external circumferential surface and configured to allow gas to flow therethrough; a housing surrounding the internal pipe and forming a space in which the water and the gas flow within the internal pipe; a drainage adjustment portion disposed inside the internal pipe and configured to open or close the first drain, wherein the drainage adjustment portion includes: a moving plate including a shape corresponding to a cross section of an internal space of the internal pipe and moving in an axial direction of the internal pipe according to flow of the gas.

20 Claims, 11 Drawing Sheets

(56) References Cited

U.S. PATENT DOCUMENTS

| | | | |
|---|---|---|---|
| 12,036,859 B2* | 7/2024 | Carbon | H02K 9/193 |
| 2004/0178015 A1* | 9/2004 | Wiemeler | F01N 1/165 |
| | | | 181/237 |
| 2008/0185218 A1* | 8/2008 | Kondo | H01M 8/04156 |
| | | | 181/252 |
| 2012/0144814 A1 | 6/2012 | Won et al. | |
| 2018/0171842 A1 | 6/2018 | Na et al. | |

FOREIGN PATENT DOCUMENTS

| | | | |
|---|---|---|---|
| JP | 08319817 A | * | 12/1996 |
| JP | 2004 156555 A | | 6/2004 |
| KR | 10 1998 036722 A | | 8/1998 |
| KR | 10 2007 0105369 A | | 10/2007 |
| KR | 10 2018 0069619 A | | 6/2015 |

* cited by examiner

II - II'

SILENCER FOR FUEL CELL VEHICLE

CROSS-REFERENCE TO RELATED APPLICATION(S)

The present application claims priority to Korean Patent Application No. 10-2022-0146661 filed on Nov. 7, 2022, the entire contents of which is incorporated herein for all purposes by this reference.

BACKGROUND OF THE PRESENT DISCLOSURE

Field of the Present Disclosure

The present disclosure relates to a silencer for a fuel cell vehicle.

Description of Related Art

Recently, a variety of eco-friendly vehicles have been developed to solve environmental problems. Such eco-friendly vehicles are typically fuel cell vehicles using fuel cells along with electric vehicles driven using batteries. Thereamong, fuel cell vehicles generate water through a hydrogen reaction in a fuel cell stack, and air, steam, hydrogen, and water generated in the stack are discharged through an exhaust line of the fuel cell vehicle. The exhaust line of the fuel cell vehicle serves as a passage for external discharge of air, water vapor, hydrogen, and water generated by the stack, and functions to drain water generated by the fuel cell.

Meanwhile, the exhaust line of the fuel cell vehicle may be provided with a silencer for reducing noise. A silencer according to the related art has a large volume and requires a mounting member. Furthermore, due to interference with surrounding components according to the large volume, the silencer may be provided apart from a noise generation area, resulting in a decrease of an effect of the silencer. Furthermore, in a process of draining water, hydrogen gas steam may be discharged along with water through a drain hose, and airflow noise may be generated.

Furthermore, the silencer according to the related art is large in size and requires a separate mounting structure, and the large size is difficult to deploy due to interference with peripheral devices such as a battery and a hydrogen tank of the fuel cell vehicle. For the present reason, if the silencer is disposed closer to a noise source, it may be more effective in reducing noise; however, due to the additional mounting structure and interference with the surrounding devices, the silencer cannot be located close to the noise source. Accordingly, there is a problem in that since the silencer is located away from the noise source, it needs to be connected and used via an exhaust hose.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a silencer for a fuel cell vehicle which may be provided without a separate mounting device.

Another aspect of the present disclosure is to provide a silencer for a fuel cell vehicle for preventing noise generated by a large amount of gas discharged through a drain under heavy loads such as driving of a fuel cell vehicle by performing drainage at a low load such as parking and stopping of the fuel cell vehicle and blocking the drain under a high load such as the driving of the fuel cell vehicle.

Yet another aspect of the present disclosure is to provide a silencer for a fuel cell vehicle which can reduce a discharge concentration of hydrogen gas by performing drainage at a low load such as parking and stopping of the fuel cell vehicle and blocking a drain under a high load such as the driving of the fuel cell vehicle so that hydrogen gas included in a large amount of gas discharged through the drain and discharged together may be discharged at a low load.

According to an aspect of the present disclosure, a silencer for a fuel cell vehicle includes: an internal pipe including a first drain disposed in a lower portion of an external circumferential surface thereof and configured to discharge water and a plurality of gas flow ports disposed in an upper portion of the external circumferential surface and configured to allow gas to flow therethrough; a housing surrounding the internal pipe and forming a space in which the water and the gas flow within the internal pipe; a drainage adjustment portion disposed inside the internal pipe and configured to open or close the first drain, and the drainage adjustment portion includes: a moving plate including a shape corresponding to a cross section of an internal space of the internal pipe and moving in an axial direction of the internal pipe according to flow of the gas.

The internal pipe may have a hollow cylindrical shape in which opposite end portions thereof are opened, and may further include an inlet through which the water and the gas are introduced and an outlet through which the gas is discharged, and the drainage adjustment portion may include a first fixing plate formed between the moving plate and the outlet.

The drainage adjustment portion may further include an elastic member disposed between the moving plate and the first fixing plate.

The gas flow port may be formed by penetrating an upper portion of the internal pipe between a first position of the moving plate and the outlet, and the first position may be a position of the moving plate in a state in which the first drain is opened.

When the moving plate is in the first position, the first drain may be opened, and the moving plate may block a gas flow to the gas flow port.

When the moving plate moves to a second position, the moving plate may open a part of the plurality of gas flow ports so that gas can flow into a space between the internal pipe and the housing and allows the gas to flow, and the second position may be a position of the moving plate in a state in which the first drain is closed.

The silencer for a fuel cell vehicle may further include a sound absorbing material provided in the space between the internal pipe and the housing.

The sound absorbing material may be provided in an upper portion of the space formed between the internal pipe and the housing.

The drainage adjustment portion includes: a drain opening/closing plate coupled to the moving plate and configured to move along with the moving plate in the axial direction of the internal pipe; and an opening/closing plate guide unit fixed to the internal pipe and configured to guide a path so that the drain opening/closing plate can open or close the first drain along the moving plate.

The opening/closing plate guide unit may further include a guide wing portion fixed to the internal pipe, and the guide wing portion may further include a third drain formed by penetrating through the guide wing portion along the axial direction of the internal pipe.

A second fixing plate may be disposed between the first fixing plate and the outlet, and the second fixing plate may form a resonance space along with the first fixing plate and the internal pipe.

The gas flow port may include at least one resonance control port, and the at least one resonance control port may be disposed on an upper portion of the internal pipe forming the resonance space and coupled to a resonance adjustment tube protruding by a predetermined length toward the resonance space from the at least one resonance control port.

According to another aspect of the present disclosure, a silencer for a fuel cell vehicle includes: an internal pipe through which water and gas discharged from a fuel cell stack pass, and of which the upper portion has a plurality of gas flow ports formed therein and of which the lower portion has a first drain formed therein; a housing forming a space at a predetermined interval in the internal pipe and surrounding an external circumferential surface of the internal pipe; and a drainage adjustment portion including a moving plate configured to move in an axial direction of the internal pipe according to the flow of the gas and a drain opening/closing portion configured to move along with the moving plate and open or close the first drain, and a first end portion of the housing is inserted into a front hose through which the gas and the water are introduced, and a second end portion of the housing is inserted into a rear hose through which the gas is discharged externally, and is fixed by a coupling member.

The drainage adjustment portion may change a position of the moving plate according to the flow amount of the gas and may allow the gas to flow through the gas flow port or allow the water to flow through the first drain.

When the moving plate is in a first position, the first drain may be opened, and the moving plate opens at least a part of the plurality of gas flow ports may be opened in a second position, and the first position may be a position of the moving plate in a state in which the first drain is opened, and the second position may be a position of the moving plate in a state in which the first drain is closed.

The internal pipe may further include an inlet through which the water and the gas are introduced and an outlet through which the gas is discharged, the drainage adjustment portion may further include a first fixing plate disposed between the moving plate and the outlet, and an elastic member disposed between the moving plate and the first fixing plate, and a position of the moving plate may be changed according to the flow amount of the gas.

A second fixing plate may be disposed between the first fixing plate and the outlet, and the second fixing plate may form a resonance space along with the first fixing plate and an internal circumferential surface of the internal pipe.

The gas flow port may include at least one resonance control port, and the at least one resonance control port may be disposed on an upper portion of the internal pipe forming the resonance space and coupled to a resonance adjustment tube protruding by a predetermined length toward the resonance space from the at least one resonance control port.

According to various exemplary embodiments of the present disclosure, a silencer for a fuel cell vehicle may be provided without a separate mounting device, and may be provided close to a noise source without significantly interfering with a peripheral device due to a small size thereof.

Furthermore, because the silencer for a fuel cell vehicle may be provided close to the noise source, it is possible to maximize a noise reduction effect due to the silencer, and reduce noise increased while moving from the noise source to the silencer, reducing the size of the silencer and the amount of sound absorbing material.

Furthermore, because water is discharged in a situation in which the load of the fuel cell vehicle is low, there is an effect of minimizing noise caused by airflow noise generated when gas is discharged together through the drain.

Furthermore, because water is discharged in a situation in which the load of the fuel cell vehicle is low, the flow rate of hydrogen gas discharged with water through the drain may be reduced, and because the diffusion of hydrogen gas is relatively reduced as compared to the conventional technology, the concentration of hydrogen measured at a position spaced from a discharge hole by a certain distance may be lowered.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
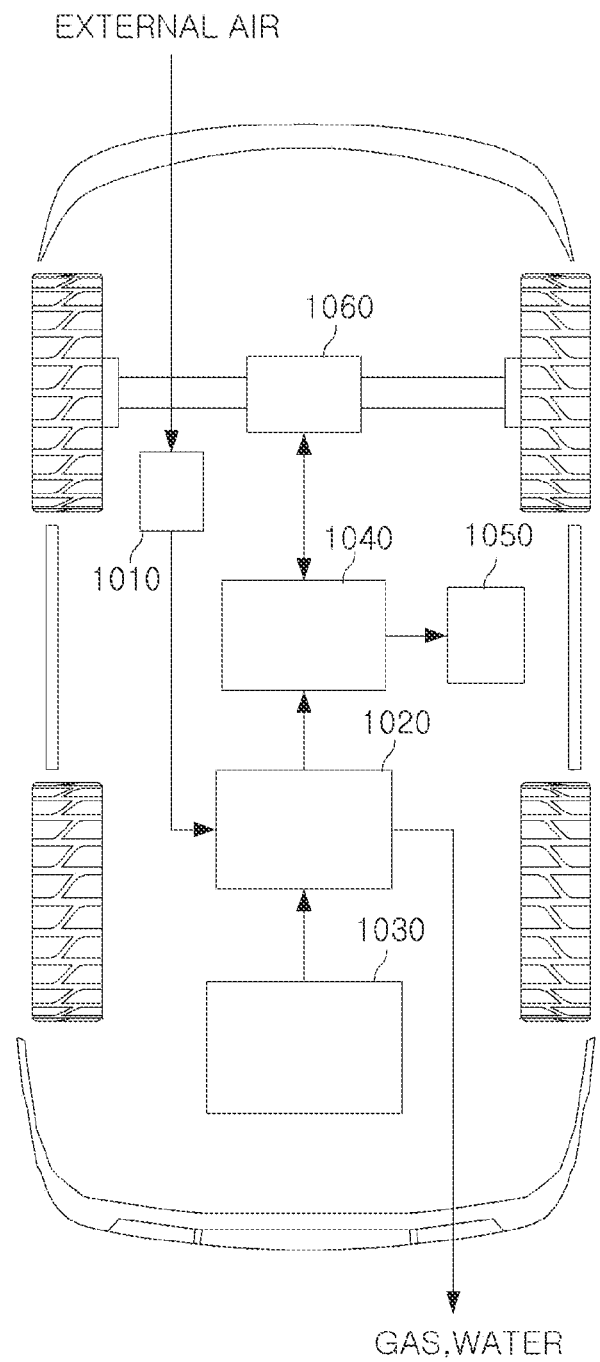
FIG. 1 is a block diagram of a fuel cell vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

While the present disclosure may be modified in various manners and may have various alternative forms, specific embodiments thereof are shown in the drawings and described in detail below. However, it should be understood that there is no intent to limit the present disclosure to the particular forms disclosed, and on the other hand, the present disclosure covers all modifications, equivalents, and alternatives falling within the spirit and scope of the present disclosure.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

The terminology used herein to describe embodiments of the present disclosure is not intended to limit the scope of the present disclosure. The articles "a," and "an" are singular in that they have a single referent, however the use of the singular form in the present specification should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Hereinafter, with reference to the accompanying drawings will be described embodiments of the present disclosure FIG. 1 is a block diagram of a fuel cell vehicle according to various exemplary embodiments of the present disclosure.

The fuel cell vehicle may be a vehicle that drives a motor with power generated by a fuel cell. The fuel cell vehicle may include an air supplier 1010, a fuel cell stack 1020, a hydrogen tank 1030, a power conversion device 1040, a battery 1050, and a motor 1060. The fuel cell stack 1020 may be configured to generate power by reacting oxygen obtained from an external air introduced through the air supplier 1010 with hydrogen supplied from the hydrogen tank 1030. The fuel cell stack 1020 may produce direct current (DC) power, and the power conversion device 1040 may convert the direct current power produced in the fuel cell stack 1020 into an alternating current (AC). The power converted into the alternating current may be supplied to the motor 1060 to generate a driving force by rotating an axis connected to the motor. Furthermore, the direct current power produced in the fuel cell stack 1020 or alternating current power generated through regenerative braking may be stored in the battery 1050 via the power conversion device 1040. The power stored in the battery 1050 may be converted into alternating current through the power conversion device 1040 and supplied to the motor 1060, similarly to the power produced in the fuel cell stack 1020. In a process of generating the power in the fuel cell stack 1020, water is generated by a chemical reaction between oxygen and hydrogen, and the generated water is discharged externally. Here, residual air obtained by partially extracting hydrogen and oxygen remaining after reacting with the generated water is discharged externally through an exhaust hose.

Furthermore, for fuel cell vehicles, because such vehicles are driven not by engines but motors, unlike ordinary gasoline vehicles, even small noises may be perceived loudly by a user. Accordingly, it is necessary to discharge residual gas including water and hydrogen through the silencer. In the instant case, as the silencer is provided closer to a noise source, noise may be effectively reduced.

Figure 2:
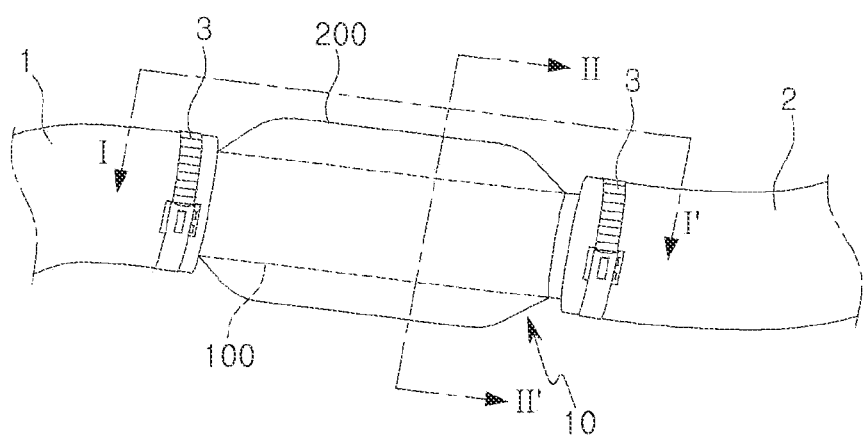
FIG. 2 is a perspective view of the silencer for a fuel cell vehicle according to various exemplary embodiments of the present disclosure.
Figure 3:
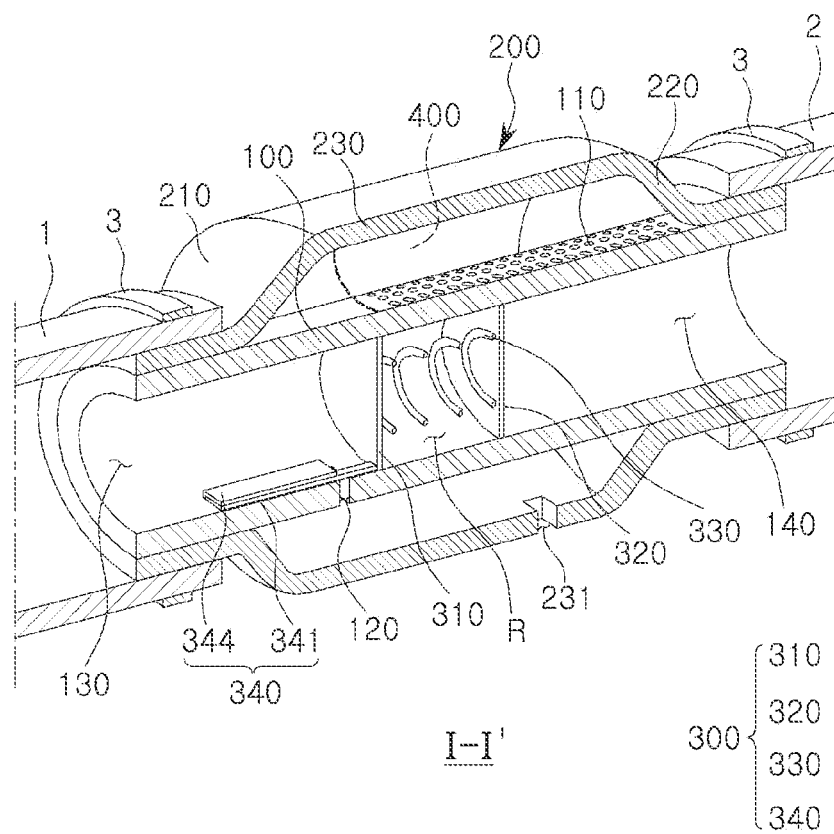
FIG. 3 is a perspective cross-sectional view taken along line I-I' of the silencer for a fuel cell vehicle according to various exemplary embodiments of the present disclosure.
Figure 4:
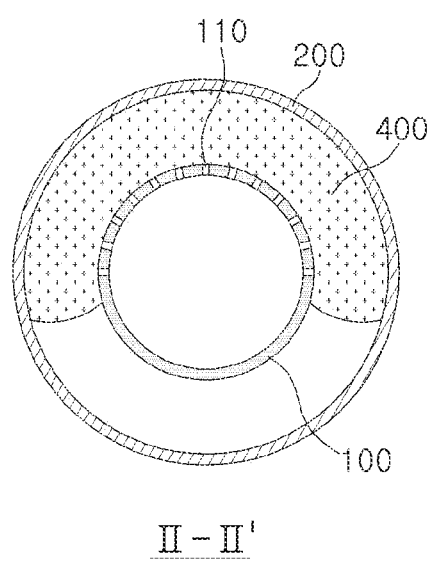
FIG. 4 is a cross-sectional view taken along line II-II' of the silencer for a fuel cell vehicle according to various exemplary embodiments of the present disclosure.
Figure 5:
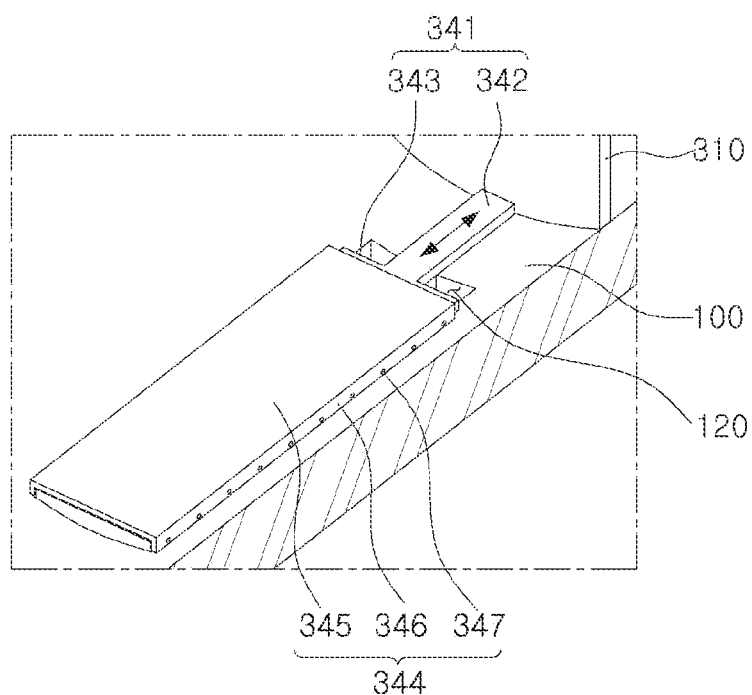
FIG. 5 is an enlarged perspective view exemplarily illustrating a drain opening/closing portion of the silencer for a fuel cell vehicle according to various exemplary embodiments of the present disclosure.

FIG. 2 is a perspective view of a silencer 10 for a fuel cell vehicle according to various exemplary embodiments of the present disclosure, FIG. 3 is a perspective cross-sectional view taken along line I-I' of the silencer 10 for a fuel cell vehicle according to various exemplary embodiments of the present disclosure, FIG. 4 is a cross-sectional view taken along line II-II' of the silencer 10 for a fuel cell vehicle according to various exemplary embodiments of the present disclosure, and FIG. 5 is an enlarged perspective view exemplarily illustrating a drain opening/closing portion 340 of the silencer 10 for a fuel cell vehicle according to various exemplary embodiments of the present disclosure.

Referring to FIG. 2, the silencer 10 for a fuel cell vehicle may be provided between a front hose 1 disposed at the fuel cell stack 1020 and a rear hose 2 fluidically connected to the external air. One side of the fuel cell vehicle silencer 10 may be inserted into the front hose 1, and the other side may be inserted into the rear hose 2, and each of the end portions is connected through a coupling member 3 such as a clamp. Water and gas generated in the fuel cell stack 1020 may be transmitted to the silencer 10 for a fuel cell vehicle through the front hose 1. The silencer 10 for a fuel cell vehicle may separate water from gas, and may discharge the water to the outside through a drain and discharge the gas to the outside through the rear hose 2 through a gas flow port 110. Here, the silencer 10 for a fuel cell vehicle according to various exemplary embodiments of the present disclosure may be coupled to a hose without a separate mounting member. Furthermore, the coupling member for coupling the silencer 10 for a fuel cell vehicle and the front hose 1 or the rear hose 2 is not limited to the clamp, and various methods such as coupling may be used to insert and fix the silencer 10 for a fuel cell vehicle into the front hose 1 or the rear hose 2.

Referring to FIG. 3, the silencer 10 for a fuel cell vehicle may include an internal pipe 100, a housing 200, and a drainage adjustment portion 300.

The internal pipe 100 may extend with a predetermined length, and may have a shape of a pipe in which opposite sides are opened. Water and gas may be introduced into one side of the internal pipe 100 through the front hose 1. The introduced water may be discharged through a first drain 120 formed in a lower surface of the internal pipe 100, and the introduced gas may penetrate the gas flow port 110 formed in an upper surface of the internal pipe 100 and be discharged through the rear hose 2 connected to the other side of the internal pipe 100. Here, one side through which water and gas are introduced through the front hose 1 may refer to an inlet 130, and the other side through which the gas introduced through the inlet 130 is discharged through the rear hose 2 may refer to an outlet 140.

The housing 200 may have a hollow body shape in which opposite sides are opened. The housing 200 may include a front hose coupling portion 210 connected to the front hose 1, a rear hose coupling portion 220 connected to the rear hose 2, and a body 230 connecting the front hose coupling portion 210 and the rear hose coupling portion 220. The front hose coupling portion 210 has a shape in which opposite sides are opened, and one side thereof is inserted between the front hose 1 and the internal pipe 100 so that an internal surface of one side may be in contact with an external surface of the internal pipe 100. The other side of the front hose coupling portion 210 may be connected to the body 230. The body 230 may be disposed between the front hose coupling portion 210 and the rear hose coupling portion 220. The body 230 may have a cross section greater than that of the internal pipe 100 and may be a hollow cylinder surrounding the internal pipe 100. The rear hose coupling portion 220 is disposed to face the front hose coupling portion 210 with the body 230 interposed therebetween, one side of the rear hose coupling portion 220 is connected to the body 230, and the internal pipe 100 is inserted into the other side thereof so that an internal surface of the other side may be in contact with the external surface of the internal pipe 100. In a state in which the internal tube 100 is inserted into the front hose coupling portion 210 and the rear hose coupling portion 220, the front hose coupling portion 210 and the rear hose coupling portion 220 may be inserted into the front hose 1 and the rear hose 2, respectively, and coupled through a coupling member 3 such as a clamp.

A second drain 231 may be formed in a lower portion of the housing 200 by penetrating through the housing 200. Water introduced into the internal pipe 100 may move into a space between the internal pipe 100 and the housing 200 through the first drain 120 and may be discharged externally through the second drain 231.

The drainage adjustment portion 300 may include a moving plate 310, a first fixing plate 320, an elastic member 330, and the drain opening/closing portion 340.

The moving plate 310 and the first fixing plate 320 are plates having a predetermined thickness, and may have a cross section corresponding to a cross section in an internal space of the internal pipe 100. In other words, the moving plate 310 and the first fixing plate 320 may interfere with the flow of gas flowing through the internal tube 100, and the gas may barely flow to a coupling portion between the moving plate 310 and the first fixing plate 320 and the internal tube 100. Here, the moving plate 310 and the first fixing plate 320 may be disposed inside the internal pipe 100, the moving plate 310 may be disposed at the inlet 130, and the first fixing plate 320 may be disposed on the outlet side thereof. The moving plate 310 may be movable in an axial direction of the internal pipe 100. Unlike the moving plate 310, the first fixing plate 320 may be fixed to the internal pipe 100 and may not move. The moving plate 310 and the first fixing plate 320 are disposed inside the internal pipe 100, and have the same shape as the cross section formed by the internal space of the internal pipe 100 to block the internal pipe 100. Furthermore, the elastic member 330 is included between the moving plate 310 and the first fixing plate 320, and the first fixing plate 320 is fixed to the internal tube 100, and the moving plate 310 may be moved. That is, the moving plate 310 may move toward the first fixing plate 320 or toward the inlet 130 according to the magnitude of the force exerted on the side of the inlet 130 due to the flow of gas. As the amount of gas flow through which the gas introduced toward the inlet 130 increases, the magnitude of the pressure exerted on the moving plate 310 may also increase. Therefore, when there is a large amount of gas introduced into the inlet 130, the moving plate 310 may move toward the first fixing plate 320, and when there is a small amount of gas introduced into the inlet 130, the moving plate 310 may move to an opposite side of the first fixing plate 320 according to a restoring force of the elastic member 330.

Here, the position in which external force lower than an elastic force of the elastic member 330 is applied to the moving plate 310 in a state in which there is a small amount of gas introduced into the inlet 130 may refer to a first position of the moving plate 310.

The elastic member 330 is disposed between the moving plate 310 and the first fixing plate 320, and when the pressure applied by the gas introduced into the moving plate 310 increases, the length of the elastic member 330 may be reduced, and when the pressure decreases, the elastic member 330 can return to its original length by the restoring force. In other words, when a fuel cell load is large, such as when the fuel cell vehicle is driving, a large amount of gas may be introduced to supply strong pressure to the moving plate 310, thus reducing the length of the elastic member 330. Accordingly, the moving plate 310 may be moved in the direction of the first fixing plate 320. Furthermore, when the fuel cell load is small, such as when the fuel cell vehicle is parked or stopped, a small amount of gas may be introduced to reduce the pressure exerted on the moving plate 310. Accordingly, the elastic member 330 returns to an original state thereof according to the restoring force, and the moving plate 310 returns to its original position thereof. Here, the elastic member 330 may be a spring in which a wire having a predetermined thickness is wound in a coil shape, but the present disclosure is not limited thereto.

The drain opening/closing portion 340 may include a drain opening/closing plate 341 and an opening/closing plate guide portion 344. Referring to FIG. 5 along with FIG. 3, the first drain 120 may be opened or closed by the drain opening/closing portion 340. The drain opening/closing plate 341 has a plate shape with a predetermined thickness, and may include a moving plate connection portion 342 coupled to the moving plate 310 and a guide insertion portion 343 inserted into the opening/closing plate guide portion 344. The width of the moving plate connection portion 342 may be different from that of the guide insertion portion 343. Here, the width of the moving plate connection portion 342 may have a width configured for opening at least a portion of the first drain hole 120, and the width of the guide insertion portion 343 may have a width configured for closing the first drain 120. In other words, when the moving plate connection portion 342 is disposed on an upper portion of the first drain 120, water may flow through the first drain 120, and conversely, when the guide insertion portion 343 is disposed on the upper portion of the first drain 120, water may not flow through the first drain 120. Here, the guide insertion portion 343 may have the same curvature as an internal surface of the internal pipe 100 and may be in contact with the internal surface of the internal pipe 100 to block the first drain 120.

The opening/closing plate guide portion 344 has a predetermined height and may include a pair of guide wing portions 346 formed on the lower surface of the internal pipe 100 and a guide cover portion 345 that connects the guide wing portions 346. The pair of guide wing portions 346 are formed to face each other in the longitudinal direction of the internal pipe 100, and may be in contact with opposite end portions of the guide insertion portion 343 in the width direction, respectively. That is, the internal surface of the internal pipe 100, the pair of wing portions and the guide cover portion 345 may have a shape surrounding the guide insertion portion 343. In other words, a lower surface of the guide insertion portion 343 has the same curvature as the internal surface of the internal tube 100 and is in contact with the internal surface of the internal tube 100, both sides of the guide insertion portion 343 are in contact with the guide wing portion 346, and an upper surface of the guide insertion portion 343 is in contact with the guide cover portion 345. The guide insertion portion 343 may move along a passage formed by the internal surface of the internal pipe 100 and the opening/closing plate guide portion 344.

Here, the guide wing portion 346 may further include a third drain 347. Water flows under the internal pipe 100, and water may also flow into a space formed between the internal surface of the internal pipe 100 and the opening/closing plate guide portion 344. When the guide insertion portion 343 moves the space formed between the internal surface of the internal pipe 100 and the opening/closing plate guide portion 344, the flowing water may generate resistance such as surface tension to interfere with the movement of the guide insertion portion 343. Accordingly, the water flowing into the space formed between the internal surface of the internal pipe 100 and the opening/closing plate guide portion 344 needs to be removed. The third drain 347 may discharge the water flowing into the space formed between the internal surface of the internal pipe 100 and the opening/closing plate guide portion 344. When gas flows in the internal tube 100, the flow rate of the space formed between the internal surface of the internal tube 100 and the opening/closing plate guide portion 344 may be small, but the flow rate outside the space may be large. According to Bernoulli's theorem, the pressure and speed where the fluid flows have an inversely proportional relationship, and more gas may flow outside the opening/closing plate guide portion 344 than the space formed between the internal surface of the internal pipe 100 and the opening/closing plate guide portion 344. Therefore, because the pressure inside the opening/closing plate guide portion 344 is greater than the outside thereof, the water inside the opening/closing plate guide portion 344 may be naturally discharged externally through the third drain 347.

Here, the position of the moving plate when the drain opening/closing plate 341 coupled to the moving plate 310 opens the first drain 120 refers to a first position, and the position of the moving plate 310 when the drain opening/closing plate 341 closes the first drain 120 refers to a second position.

Referring back to FIG. 3, the internal pipe 100 may include the gas flow port 110 and the first drain 120.

The gas flow port 110 may be disposed only in the upper portion of the internal pipe 100, and a plurality of gas flow ports may be formed from the first position of the moving plate 310 in the direction of the rear hose 2. Here, the first position of the moving plate 310 may be a position of the moving plate 310 in a state in which there is no pressure applied by the introduced gas to the moving plate 310 or the pressure is low, which has a state in which the first drain 120 may remain open. The gas flow port 110 may be formed in the direction of the rear hose 2 in the first position of the moving plate 310, and may not be formed at the front hose 1 in the first position of the moving plate 310. When the gas flow port 110 is formed between the front hose 1 and the first position of the moving plate 310, while the gas introduced through the front hose 1 applies the pressure to the moving plate 310, the introduced gas may be discharged to the gas flow port 110 formed at the front hose 1, and accordingly the pressure applied to the moving plate 310 may be reduced to allow the moving plate 310 not to move. Accordingly, the gas flow port 110 may be formed in the first position of the moving plate 310 in the direction of the rear hose 2.

Furthermore, the gas flow port 110 may be formed only in the upper portion of the internal pipe 100. A sound absorbing material 400 described below may be provided in the space between the internal pipe 100 including the gas flow port 110 formed therein and the housing 200, and when the gas flow port 110 is formed at the bottom portion, the sound absorbing material 400 surrounding the gas flow port 110 formed at the bottom is wet with water, resulting in not only degrading the function of the sound absorbing material 400 but also preventing the discharge of water.

The first drain 120 may be disposed between the front hose 1 and the first position of the moving plate 310 and may be formed to penetrate a lower portion of the internal pipe 100.

The sound absorbing material 400 may be provided in the space between the internal pipe 100 and the housing 200. Referring to FIG. 4, the sound absorbing material 400 may be formed in an upper space between the internal pipe 100 and the housing 200 and formed to surround the formed gas flow port 110, corresponding to a portion where the gas flow port 110 formed in the internal pipe 100 is formed. That is, all gases flowing into the internal pipe 100 and passing through the gas flow port 110 may pass through the sound absorbing material 400 and be then discharged by flowing back to the internal pipe 100 through the gas flow port 110.

The sound absorbing material 400 may be configured to absorb noise while gas flows. Furthermore, the sound absorbing material 400 may be formed in an upper space between the internal tube 100 and the housing 200 and fail to disturb the flow of water through the lower space, which can prevent performance degradation and weight increase by causing the sound absorbing material 400 to absorb water.

Figure 6A:
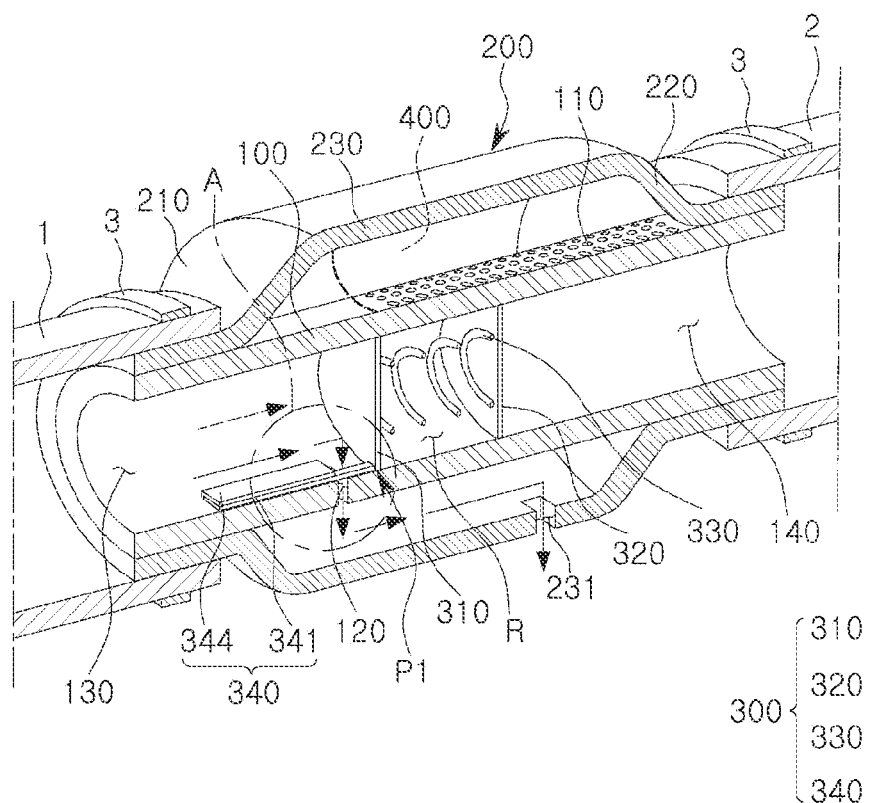
FIG. 6A is a view exemplarily illustrating a state in which a small amount of gas flows in the silencer for a fuel cell vehicle according to various exemplary embodiments of the present disclosure.
Figure 6B:
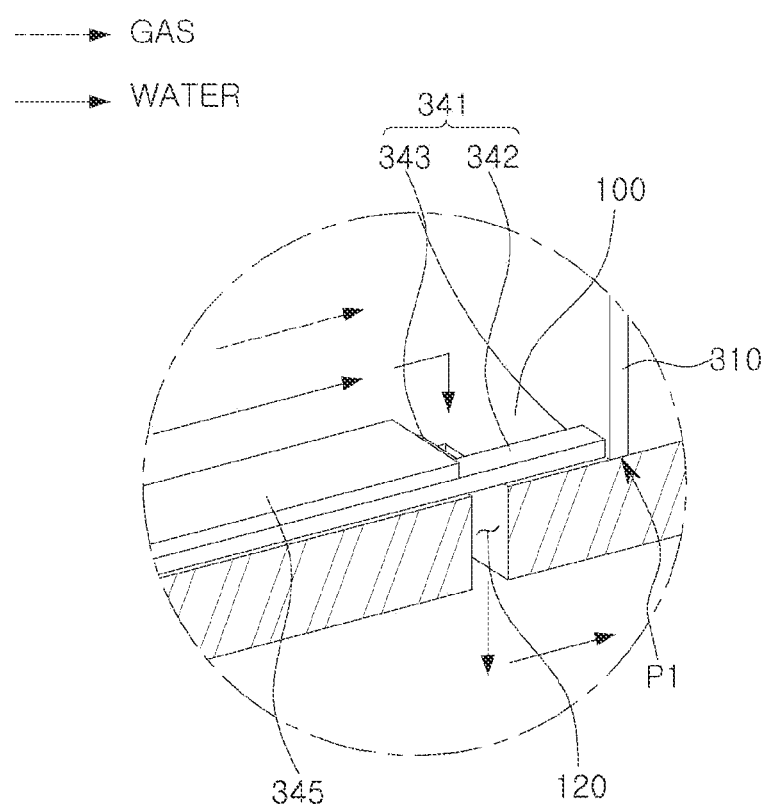
FIG. 6B is an enlarged view exemplarily illustrating a state of the drain opening/closing portion when a small amount of gas flows in the silencer for a fuel cell vehicle according to various exemplary embodiments of the present disclosure.
Figure 7A:
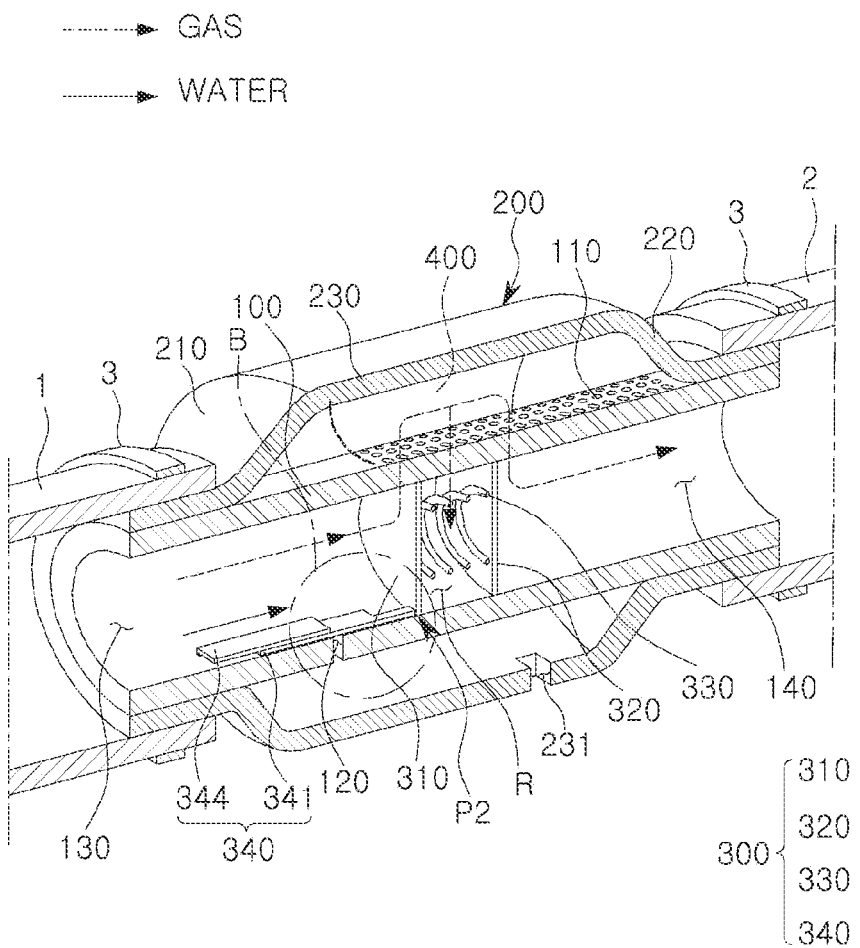
FIG. 7A is a view exemplarily illustrating a state in which a large amount of gas flows in the silencer for a fuel cell vehicle according to various exemplary embodiments of the present disclosure.
Figure 7B:
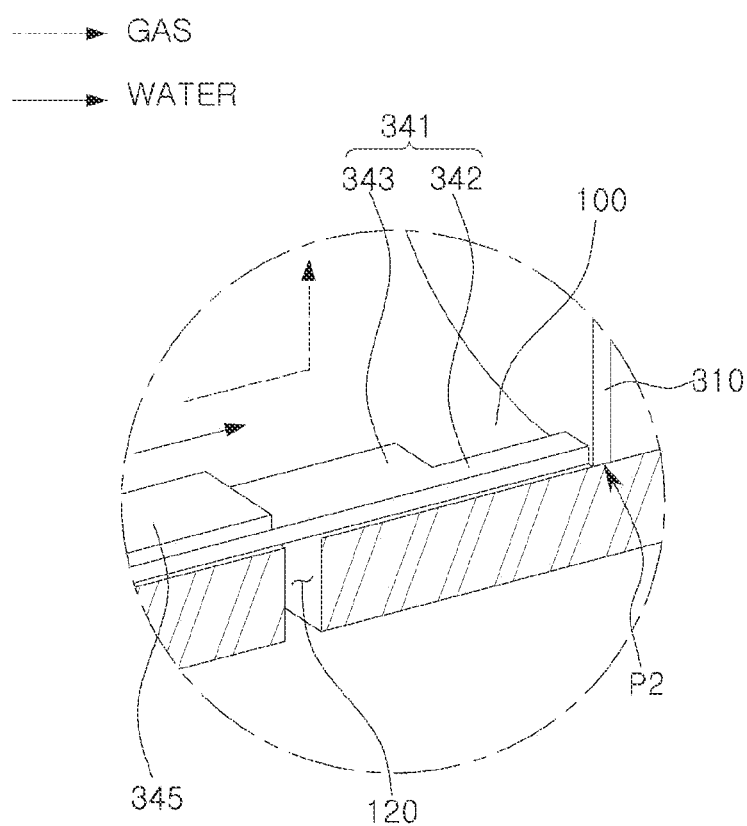
FIG. 7B is an enlarged view exemplarily illustrating a state of the drain opening/closing portion when a large amount of gas flows in the silencer for a fuel cell vehicle according to various exemplary embodiments of the present disclosure.

FIG. 6A is a view exemplarily illustrating a state in which a small amount of gas flows in the silencer 10 for a fuel cell vehicle according to various exemplary embodiments of the present disclosure, FIG. 6B is an enlarged view exemplarily illustrating a state of the drain opening/closing portion 340 when a small amount of gas flows in the silencer 10 for a fuel cell vehicle according to various exemplary embodiments of the present disclosure, FIG. 7A is a view exemplarily illustrating a state in which a large amount of gas flows in the silencer 10 for a fuel cell vehicle according to various exemplary embodiments of the present disclosure, and FIG. 7B is an enlarged view exemplarily illustrating a state of the drain opening/closing portion 340 when a large amount of gas flows in the silencer 10 for a fuel cell vehicle according to various exemplary embodiments of the present disclosure. Here, the position of the moving plate in a state in which the drain opening/closing plate 341 coupled to the moving plate 310 opens the first drain 120 may refer to a first position P1, and the position of the moving plate 310 in a state in which the drain opening/closing plate 341 closes the first drain 120 may refer to a second position P2.

Referring to FIGS. 6A, 6B, 7A, and 7B, an operation of the silencer 10 for a fuel cell vehicle according to various exemplary embodiments of the present disclosure will be described.

FIG. 6A and FIG. 6B illustrate the operating state of the silencer 10 for a fuel cell vehicle in a state in which the flow rate of gas introduced from the fuel cell is low due to a low load of the fuel cell by the parking or stopping of the vehicle. When the fuel cell vehicle has a low load, because the flow rate of gas flowing through the fuel cell is low, the pressure of the introduced gas pushing the moving plate 310 may be less than the elastic force of the elastic member 330, and the moving plate 310 may be in the first position P1. Referring to FIG. 6B, when the moving plate 310 is in the first position P1, the moving plate connection portion 342 of the drain opening/closing portion 340 coupled to the moving plate 310 may be disposed in the first drain 120, and the first drain 120 may be opened. Accordingly, the water introduced through the internal pipe 100 with gas flows into the space between the internal pipe 100 and the housing 200 through a first drain pipe and may be discharged externally through the second drain 231. Furthermore, as the moving plate 310 maintains the first position P1 of the moving plate 310, the introduced gas may be formed toward the rear hose 2 in the first position P1 of the moving plate 310 and may not flow through the gas flow port portion. Here, the gas introduced into the internal pipe 100 may also flow along with the water through the first drain 120 and the second drain 231, but because the flow rate of the gas is not high, the magnitude of noise caused by an airflow sound may be low.

FIG. 7A and FIG. 7B illustrate an operating state of the silencer 10 for a fuel cell vehicle in a state in which the flow rate of gas introduced from the fuel cell is high due to a large load of the fuel cell during the driving of the vehicle. When there is the high flow rate of the gas introduced from the fuel cell, the pressure applied by the introduced gas to the moving plate 310 may be greater than the elastic force of the elastic member 330, and the moving plate 310 may move toward the first fixing plate 320. Referring to FIG. 7B, the drain opening/closing plate 341 of the drain opening/closing portion 340 coupled to the moving plate 310 may move to the second position P2 disposed at the first fixing plate 320, and the guide insertion portion 343 of the drain opening/closing plate 341 may protrude to close the first drain 120.

Furthermore, by moving the moving plate 310 from the first position P1 of the moving plate 310 to the second position P2 disposed at the first fixing plate 320, the gas flow port 110 is exposed to the upper surface of the internal pipe 100 into which the gas is introduced, and the introduced gas may flow into a space between the internal pipe 100 and the housing 200 through the gas flow port 110. The introduced gas flowing through the gas flow port 110 may pass through the sound absorbing material 400. The gas passing through the sound absorbing material 400 may flow into the internal pipe 100 and may be discharged to the rear hose 2 by passing through a resonance space R formed by the moving plate 310 and the first fixing plate 320 or through the gas flow port 110 disposed between the first fixing plate 320 and the rear hose 2 without passing through the resonance space R. That is, the disposed gas absorbs noise through the sound absorbing material 400, and additionally reduces the noise through the resonance space R formed by the moving plate 310, the first fixing plate 320 and the internal pipe 100. Here, the resonance space R may be a space surrounded by the moving plate 310, the first fixing plate 320, and the internal pipe 100.

The resonance space R may be a space in which sound in a specific frequency band introduced into the resonance space R may be offset using a resonance phenomenon. Here, the frequency offset in the resonance space R may be confirmed through a resonance equation of Helmholtz as shown in Equation 1.

$$f = \frac{c}{2\pi}\sqrt{\frac{S}{VL}} \qquad \text{<Equation 1>}$$

Here, c may be the sound speed, S may be a cross-sectional area of a neck through which a sound passes and indicate the diameter of the gas flow port 110, V may be the volume of the resonance space R, and L may be the length of the neck through which the sound passes and refer to the thickness of the internal tube 100.

Referring to Helmholtz's resonance equation as in Equation 1, the resonance space R formed by various exemplary embodiments of the present disclosure continuously changes the volume of the resonance space R by movement of the moving plate 310. Therefore, because the frequency of the noise offset by the resonance space R is continuously changed, noise in various frequency bands, rather than in a specific frequency, may be reduced.

Figure 8:
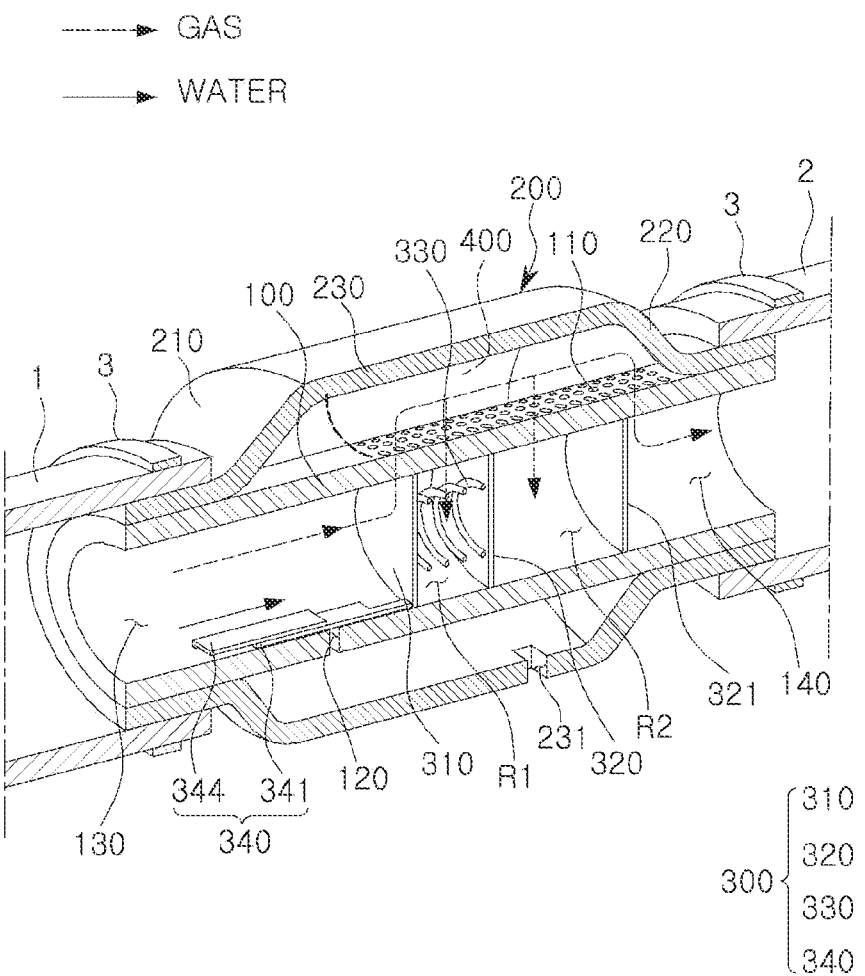
FIG. 8 is a cross-sectional perspective view of the silencer for a fuel cell vehicle according to various exemplary embodiments of the present disclosure.
Figure 9:
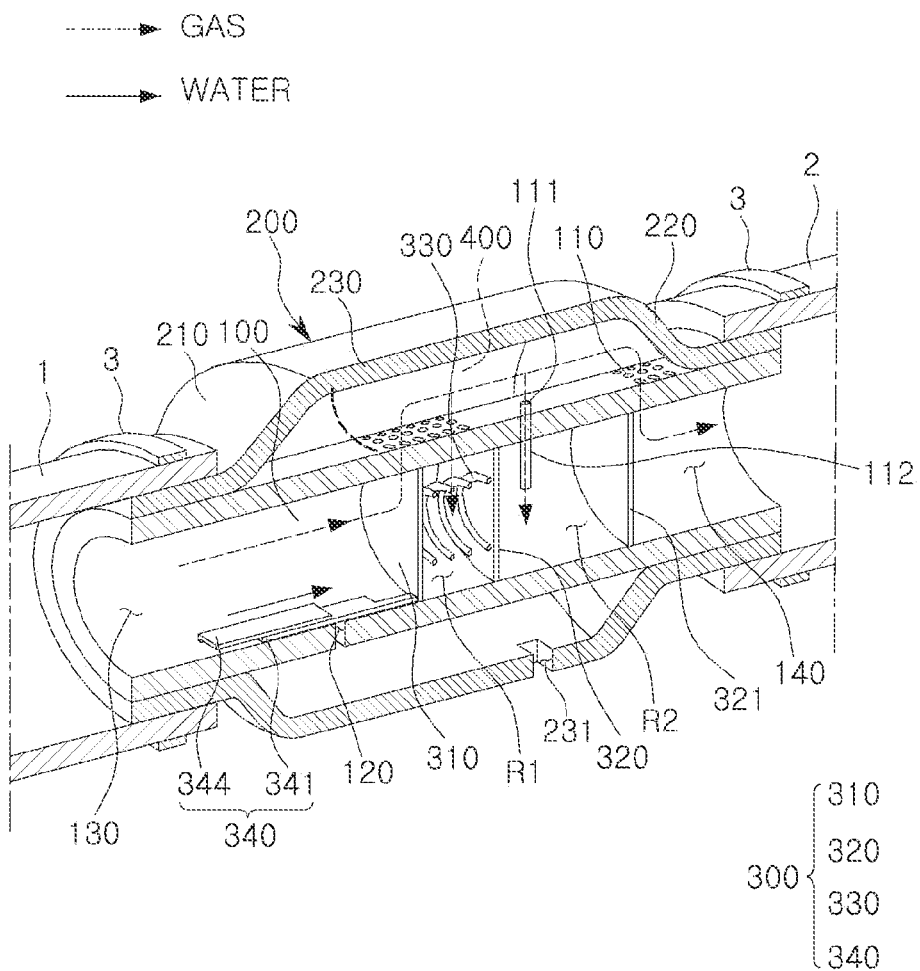
FIG. 9 is a cross-sectional perspective view of the silencer for a fuel cell vehicle according to various exemplary embodiments of the present disclosure.

Referring to FIG. 8 and FIG. 9, a modified example of the silencer 10 for a fuel cell vehicle will be described. FIG. 8 is a cross-sectional perspective view of the silencer 10 for a fuel cell vehicle according to various exemplary embodiments of the present disclosure, and FIG. 9 is a cross-sectional perspective view of the silencer 10 for a fuel cell vehicle according to various exemplary embodiments of the present disclosure Referring to FIG. 8, the silencer 10 for a fuel cell vehicle according to various exemplary embodiments of the present disclosure may further include a second fixing plate 321. The second fixing plate 321 may be disposed at an opposite side of the moving plate 310 with respect to the first fixing plate 320, facing the first fixing plate 320. That is, the first fixing plate 320 may be disposed between the moving plate 310 and the second fixing plate 321. Here, the first fixing plate 320, the second fixing plate 321, and the internal pipe 100 may form a resonance space R2. A resonance space formed by the moving plate 310 and the first fixing plate 320 may refer to the first resonance space R1, and a resonance space formed by the first fixing plate 320 and the second fixing plate 321 may refer to the second resonance space R2. In the second resonance space R2, unlike the first resonance space R1 in which the moving plate 310 moves to adjust the volume of the resonance space, both the first fixing plate 320 and the second fixing plate 321 are fixed to offset only the sound of a specific frequency. Accordingly, the second resonance space R2 may form the second fixing plate 321 according to the frequency band of the noise generated the most among the noises generated by a noise source.

Referring to FIG. 9, the silencer 10 for a fuel cell vehicle according to various exemplary embodiments of the present disclosure may further include at least one resonance adjuster 111 and a resonance adjustment tube 112. Here, the resonance adjuster 111 may be a resonant control port as a gas flow port formed in the internal pipe 100 forming the second resonance space R2 among a plurality of gas flow ports 110. Furthermore, the resonance adjustment tube 112 may be coupled to the resonance adjuster 111 to allow air to flow into the internal pipe 100, and may protrude into the internal pipe 100 by a predetermined length. Referring to the resonance equation of Helmholtz of Equation 1 described above, the length of the resonance adjustment tube 112 in the silencer 10 for a fuel cell vehicle may be the length of the neck. In other words, in the resonance spaces R and R1 that do not include the resonance adjustment tube 112, the length of the neck through which the introduced gas passes is limited to the thickness of the internal tube 100, but the length of the neck of the resonance space R2 that includes the resonance adjustment tube 112 is the length of the inserted resonance adjustment tube 112. Accordingly, the resonance space not including the resonance adjustment tube 112 has a short neck and is thus suitable for offsetting a high-frequency noise. Furthermore, because the resonance space including the resonance adjustment tube 112 can form a longer neck, it can offset a low-frequency noise and adjust the length of the resonance adjustment tube 112 to adjust the frequency band of the offset noise.

Most countries limit the concentration of hydrogen discharged by exhaust gas. For example, when hydrogen is detected at a distance of 100 mm away from the outlet 140, the hydrogen concentration of the discharged gas may be limited so as not to exceed an average of 4% and an instantaneous maximum of 8%. The silencer 10 according to the related art has a structure in which water is constantly discharged through a drain while the fuel cell vehicle is driving. Accordingly, because the silencer 10 according to the related art may not control the gas discharged through the drain, the hydrogen gas concentration may be detected to be high. On the other hand, the silencer 10 for a fuel cell vehicle according to various exemplary embodiments of the present disclosure can block the drain during the driving to block the gas discharged along with water, and the silencer 10 opens the drain only under the condition of low flow of the discharged gas, for example, when parking or stopping the vehicle, minimizing the amount of hydrogen gas discharged to the drain.

Furthermore, because the silencer 10 according to the related art has the drain which is always open during the driving, a high flow of gas may be discharged along with water through the drain to generate an airflow sound. In contrast, the silencer 10 for a fuel cell vehicle of the present disclosure can close the drain under the condition in which a high flow of gas is discharged, reducing the airflow sound generated when the gas is discharged through the drain.

Furthermore, the silencer 10 for a fuel cell vehicle according to various exemplary embodiments of the present disclosure may adjust the opening and closing of the drain according to the driving state of the fuel cell vehicle. Furthermore, the silencer 10 can eliminate the noise of various frequencies and be manufactured to further eliminate specific frequencies, and may be provided close to the noise source because it has features of easy installation and a small size.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A silencer apparatus of a fuel cell vehicle, the silencer apparatus comprising:
   an internal pipe including:
      a first drain disposed in a lower portion of an external circumferential surface thereof and configured to discharge water therethrough; and
      a plurality of gas flow ports disposed in an upper portion of the external circumferential surface and configured to allow gas to flow therethrough;
   a housing surrounding the internal pipe and forming a space in which the water and the gas flow within the internal pipe;
   a drainage adjustment portion disposed inside the internal pipe and configured to open or close the first drain,
   wherein the drainage adjustment portion includes a moving plate having a shape corresponding to a cross section of an internal space of the internal pipe and moving in an axial direction of the internal pipe according to flow of the gas; and
   a drain opening/closing plate coupled to the moving plate and configured to move along with the moving plate in the axial direction of the internal pipe; and
   wherein based on the drain opening/closing plate opening the first drain, the moving plate blocks flow of the gas to the plurality of gas flow ports and based on the drain opening/closing plate closing the first drain, the moving plate opens a part of the plurality of gas flow ports.

2. The silencer apparatus of claim 1,
   wherein the internal pipe has a shape of a hollow cylinder in which opposite end portions thereof are opened, and further includes an inlet through which the water and the gas are introduced and an outlet through which the gas is discharged, and
   wherein the drainage adjustment portion further includes a first fixing plate formed between the moving plate and the outlet and fixed to the internal plate.

3. The silencer apparatus of claim 2, wherein the drainage adjustment portion further includes an elastic member disposed between the moving plate and the first fixing plate.

4. The silencer apparatus of claim 2,
wherein the plurality of gas flow ports is formed in an upper portion of the internal pipe between a first position of the moving plate and the outlet, and
wherein the first position is a position of the moving plate in a state in which the first drain is opened.

5. The silencer apparatus of claim 4, wherein when the moving plate is in the first position, the first drain is opened, and the moving plate blocks flow of the gas to the plurality of gas flow ports.

6. The silencer apparatus of claim 4,
wherein when the moving plate moves to a second position, the moving plate opens a part of the plurality of gas flow ports for the gas to flow in a space between the internal pipe and the housing and allows the gas to flow, and
wherein the second position is a position of the moving plate in a state in which the first drain is closed.

7. The silencer apparatus of claim 1, further including:
a sound absorbing material provided in the space between the internal pipe and the housing.

8. The silencer apparatus of claim 7, wherein the sound absorbing material is provided in an upper portion of the space formed between the internal pipe and the housing.

9. The silencer apparatus of claim 8, wherein a second drain is formed in a lower portion of the housing.

10. The silencer apparatus of claim 1, wherein the drainage adjustment portion includes:
an opening/closing plate guide unit fixed to the internal pipe and configured to guide a path of the drain opening/closing plate so that the drain opening/closing plate opens or closes the first drain along the moving plate.

11. The silencer apparatus of claim 10,
wherein the opening/closing plate guide unit further includes a guide wing portion fixed to the internal pipe, and
wherein the guide wing portion further includes a third drain formed by penetrating through the guide wing portion along the axial direction of the internal pipe.

12. The silencer apparatus of claim 2,
wherein a second fixing plate is disposed between the first fixing plate and the outlet, and
wherein the second fixing plate forms a resonance space along with the first fixing plate and the internal pipe.

13. The silencer apparatus of claim 12,
wherein at least one of the plurality of gas flow ports includes at least one resonance control port, and
wherein the at least one resonance control port is disposed on an upper portion of the internal pipe forming the resonance space and coupled to a resonance adjustment tube protruding by a predetermined length toward the resonance space from the at least one resonance control port.

14. A silencer apparatus of a fuel cell vehicle, the silencer apparatus comprising:
an internal pipe through which water and gas discharged from the fuel cell stack pass, and of which an upper portion has a plurality of gas flow ports and of which a lower portion has a first drain;
a housing forming a space at a predetermined interval in the internal pipe and surrounding an external circumferential surface of the internal pipe; and
a drainage adjustment portion including a moving plate configured to move in an axial direction of the internal pipe according to flow of the gas and a drain opening/closing portion configured to move along with the moving plate and open or close the first drain,
wherein a first end portion of the housing is inserted into a front hose through which the gas and the water are introduced, and a second end portion of the housing is inserted into a rear hose through which the gas is discharged externally, and each of the first and second end portions are fixed by a coupling member, and
wherein based on a drain opening/closing plate opening the first drain, the moving plate blocks flow of the gas to the plurality of gas flow ports and based on the drain opening/closing plate closing the first drain, the moving plate opens a part of the plurality of gas flow ports.

15. The silencer apparatus of claim 14, wherein the drainage adjustment portion changes a position of the moving plate according to a flow amount of the gas and allows the gas to flow through the plurality of gas flow ports or allows the water to flow through the first drain.

16. The silencer apparatus of claim 15,
wherein when the moving plate is in a first position, the first drain is opened, and at least a part of the plurality of gas flow ports is opened in a second position of the moving plate, and
wherein the first position is a position of the moving plate in a state in which the first drain is opened, and the second position is a position of the moving plate in a state in which the first drain is closed.

17. The silencer apparatus of claim 14,
wherein the internal pipe further includes an inlet through which the water and the gas are introduced and an outlet through which the gas is discharged,
wherein the drainage adjustment portion further includes a first fixing plate disposed between the moving plate and the outlet and fixed to the internal pipe, and an elastic member disposed between the moving plate and the first fixing plate, and
wherein a position of the moving plate is changed according to a flow amount of the gas.

18. The silencer apparatus of claim 17,
wherein a second fixing plate is disposed between the first fixing plate and the outlet, and
wherein the second fixing plate forms a resonance space along with the first fixing plate and an internal circumferential surface of the internal pipe.

19. The silencer apparatus of claim 18,
wherein the plurality of gas flow ports includes at least one resonance control port, and
wherein the at least one resonance control port is disposed on an upper portion of the internal pipe forming the resonance space and coupled to a resonance adjustment tube protruding by a predetermined length toward the resonance space from the at least one resonance control port.

20. The silencer apparatus of claim 14,
wherein a second drain is formed in a lower portion of the housing, and
wherein the drainage adjustment portion further includes a third drain discharging the water flowing into a space formed between an internal surface of the internal pipe and the drain opening/closing portion.

* * * * *